(12) United States Patent
Mingebach et al.

(10) Patent No.: US 10,650,999 B2
(45) Date of Patent: May 12, 2020

(54) BEARING ELEMENT WITH POLYGONAL CROSS SECTION

(71) Applicant: OSRAM GmbH, Munich (DE)

(72) Inventors: Markus Mingebach, Neuburg an der Donau (DE); Helmut Dandl, Eichstaett (DE); Bernhard Ruhland, Dollnstein (DE)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 16/402,241

(22) Filed: May 3, 2019

(65) Prior Publication Data

US 2019/0348246 A1 Nov. 14, 2019

(30) Foreign Application Priority Data

May 9, 2018 (DE) .................. 10 2018 207 249

(51) Int. Cl.
*H01J 1/92* (2006.01)
*H01J 1/18* (2006.01)
*F16C 33/26* (2006.01)

(52) U.S. Cl.
CPC .................. *H01J 1/92* (2013.01); *H01J 1/18* (2013.01); *F16C 33/26* (2013.01); *F16C 2362/00* (2013.01)

(58) Field of Classification Search
CPC ........ H01J 1/18; H01J 1/88; H01J 1/94; H01J 1/96; H01J 1/98
See application file for complete search history.

(56) References Cited

U.S. PATENT DOCUMENTS

| 5,663,607 A | * | 9/1997 | Kira | .......................... H01J 5/60 313/252 |
| 6,954,032 B2 | | 10/2005 | Chiba | |
| 8,368,304 B2 | | 2/2013 | Baacke et al. | |
| 2012/0049731 A1 | | 3/2012 | Baacke et al. | |

FOREIGN PATENT DOCUMENTS

DE 102009019526 A1 11/2010

OTHER PUBLICATIONS

German Search Report based on Application No. 10 2018 207 249.3 (8 pages) dated Dec. 14, 2018 (for reference purpose only).

* cited by examiner

*Primary Examiner* — Anne M Hines
(74) *Attorney, Agent, or Firm* — Viering, Jentschura & Partner mbB

(57) ABSTRACT

Various embodiments provide a bearing element for an electrode rod in a lamp stem. The bearing element includes an envelope configured in order to extend along a longitudinal axis of the electrode rod. The envelope has a polygonally shaped cross section at least in sections.

18 Claims, 3 Drawing Sheets

BEARING ELEMENT WITH POLYGONAL CROSS SECTION

CROSS-REFERENCE TO RELATED APPLICATION

This application claims priority to German Patent Application Serial No. 10 2018 207 249.3, which was filed May 9, 2018, and is incorporated herein by reference in its entirety.

TECHNICAL FIELD

Various embodiments relate generally to a bearing element for an electrode rod in a lamp stem, including an envelope configured in order to extend along a longitudinal axis of the electrode rod. Various embodiments also relate to a bearing arrangement including a multiplicity of such bearing elements, to a lamp including such, to a production method for a lamp, and to the use of an envelope as a bearing element.

BACKGROUND

DE 10 2009 019 526 A1 discloses a discharge lamp, an electrode being held while being supported in a lamp stem, arranged coaxially therewith, in the region of a narrowed section by a damping/guide element. The damping/guide element is axially fixed with a form fit by the narrowed section and is thereby clamped. This design is suitable for resilient bearing only up to a certain magnitude of an impact. Impacts occur for example during production, transport, handling and use of a discharge lamp.

Described by way of example in other words: a discharge lamp, for example an OSRAM XBO® xenon discharge lamp, has a high fill pressure and may be susceptible to various types of glass damage, in particular of the lamp body. One technical challenge is to introduce the electrode rod into the glass lamp body, in which case an anode body weighing for example up to several hundred grams may be fitted on the electrode rod, and simultaneously to achieve a sufficient mechanical strength. Therefore, besides gas-tight fixed bearing of the electrode rod on the lamp stem bottom side along the profile of the electrode rod in the lamp stem, a bearing section is provided, particularly in the region of a pinch of the lamp stem, in order to support the electrode rod. This bearing section of the lamp stem is a weak point in relation to mechanical stresses, for example due to vibration, for example as a result of an impact. An impact may therefore lead indirectly or directly to breakage or failure of the lamp body.

SUMMARY

Various embodiments provide a bearing element for an electrode rod in a lamp stem. The bearing element includes an envelope configured in order to extend along a longitudinal axis of the electrode rod. The envelope has a polygonally shaped cross section at least in sections.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The figures are merely schematic in nature and serve only for understanding various embodiments. Elements which are the same are provided with the same features throughout the figures and embodiments. Repeated description of features which are the same is for the most part omitted. Features of the one embodiment may also be contained in the other embodiment, i.e. they are thus partially interchangeable with one another.

Figure 1:
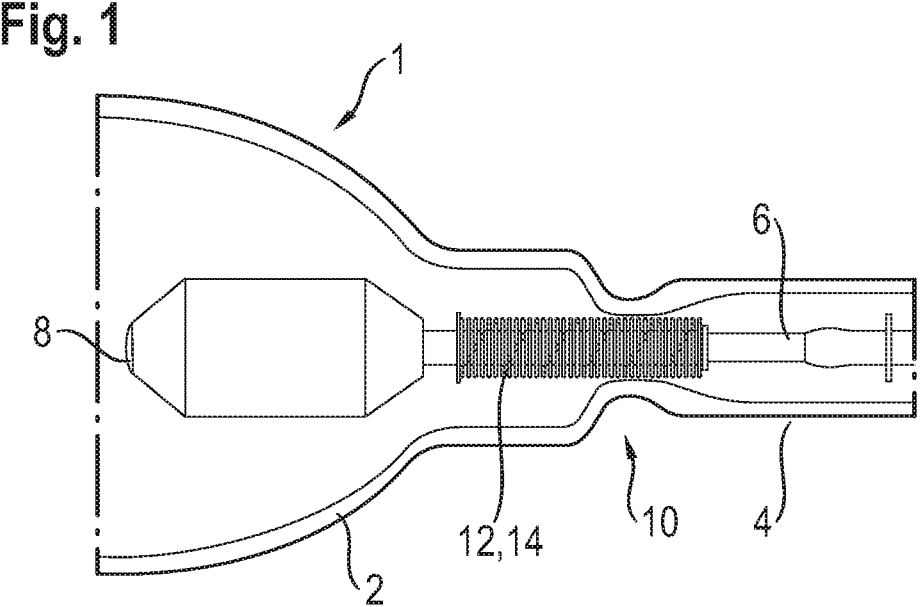
FIG. 1 shows in a side view, a lamp having a lamp stem in which a bearing element with a polygonal cross section surrounds an electrode rod in the manner of a coil.
Figure 2:
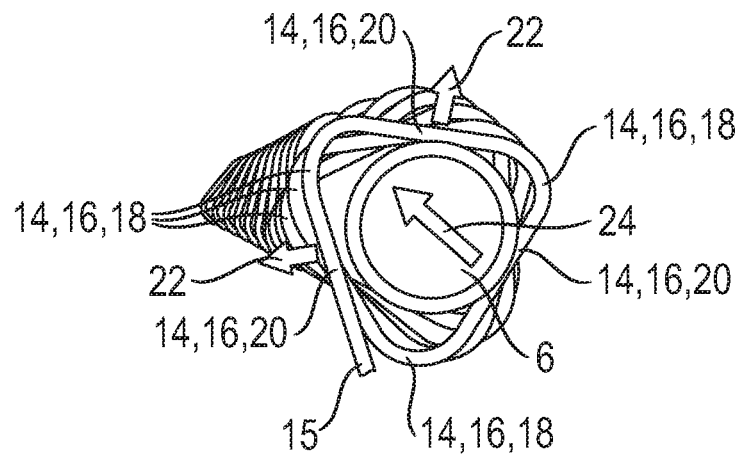
FIG. 2 shows in an axial plan view, an electrode rod which is enclosed in the manner of a coil by a bearing element with a polygonal cross section.
Figure 3:
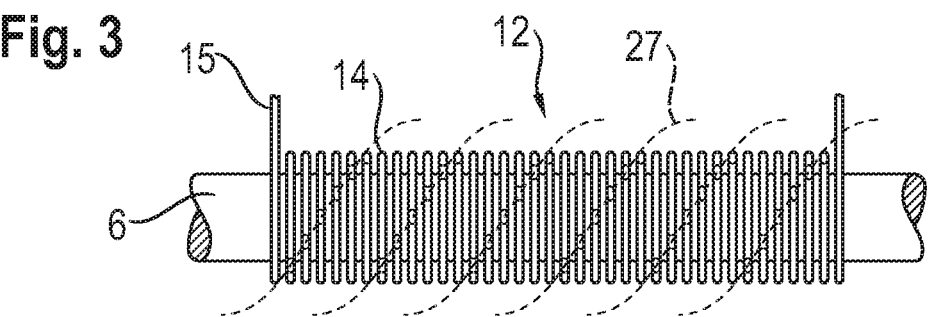
FIG. 3 shows in a side view, an electrode rod which is enclosed in the manner of a coil by a bearing element with a polygonal cross section.

FIG. 1 to FIG. 3 show an implementation of various embodiments. Besides a lamp body 2, a lamp 1 contains a lamp stem 4, which is formed from glass, e.g. quartz glass and is connected firmly and in a gas-tight fashion on the bottom side (not represented) to a metallic electrode rod 6. In the present case, the lamp body 2 is a discharge vessel. The electrode rod 6 is, for example, formed from tungsten. At the end, interior to the lamp, of the electrode rod, which has a diameter of for example about 5.5 mm, in the present case there is an anode body 8 weighing for example about 500 g.

The lamp stem 4 is connected to the lamp body 2 by the step melt-in method, a circumferential pinch 10 being formed in the region of the connection. The pinch 10 (and the lamp body 2, if the electrode rod 6 is being braced thereby) applies here as part of the lamp stem 4. Radially inward on this pinch 10, the electrode rod 6 is braced for example divalently with the interposition of a bearing element 12.

The bearing element 12 contains an envelope 14 mode of a wire 15 with a diameter that is matched to the electrode rod diameter, for example from 0.4 to 1.6 mm, e.g. from 0.6 to 1.3 mm. The wire 15 is, considered along a longitudinal axis of the envelope 14 or of the electrode rod 6 concentric therewith, a polygon 16 or in the manner of a coil spring so as to form a polygonal cross section.

In the present case, the polygon 16 has a triangular cross section with straight sides. In the installation position, the polygonal cross section of the envelope 14 circumscribes the electrode rod 6, which may be circular in cross section. In the installation position, the polygonal cross section of the envelope 14 is circumscribed by the pinch 10, which may likewise be circular in cross section.

FIG. 2 shows by way of example resilient supporting of the electrode rod 6. The wire 15 of the envelope 14 includes in one turn around the electrode rod 6 (at any event in the installation position) three to four convex sections 18 and three straight sections 20 in alternating sequence between them. The wire is rounded in the region of the convex sections 18. An impact on the lamp 1, for example in the event of horizontal storage in transport packaging (not shown) leads to a corresponding impact on the electrode rod 6 and therefore to a yielding elastic movement 22 of the straight section/s 20 lying in an impact movement direction 24 of the electrode rod and/or next thereto. The impact energy is in this case absorbed by an elastic deformation of the spiral forming the envelope 14, so that for example a stress peak which damages the lamp stem 4 or the pinch 10 can be avoided.

FIG. 3 shows, in order to illustrate a production method, an envelope 14 which is placed on an electrode rod 6 and has a coil 27 (a lamp stem 4 possibly already connected to the electrode rod 6 is not represented). In the state shown, the envelope 14 radially surrounds the electrode rod 6, or is fitted thereover, so that the electrode rod 4 rests radially inward in a close contact relation on the straight sections 20 of the envelope.

Figure 4:
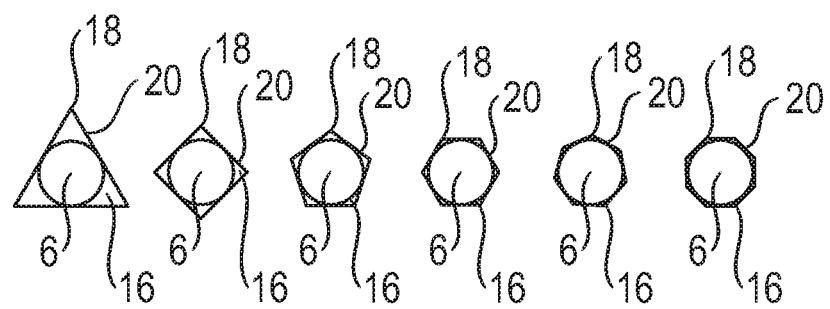
FIG. 4 shows polygons with 3, 4, 5, 6, 7 and 8 convex sections and in each case a straight section between them.
Figure 5:
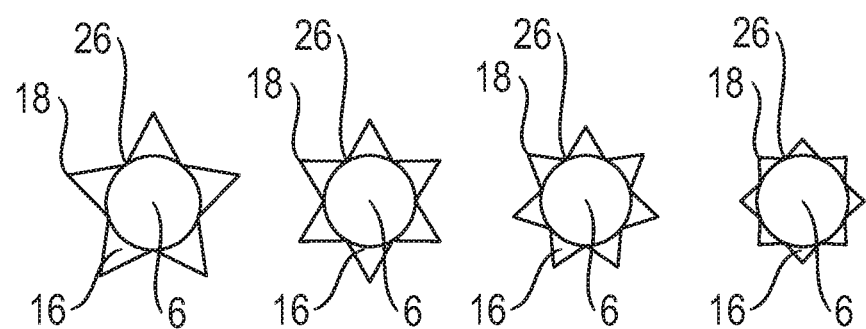
FIG. 5 shows polygons with 5, 6, 7 and 8 convex sections and in each case a concave section between them.

FIG. 4 and FIG. 5 show in outline a plurality of polygons 16, which respectively circumscribe closely in each case a, by way of example circular, cross section of a respective electrode rod 6. The polygons of FIG. 4, between the convex sections 18 which are configured in order to rest internally on the pinch 10 or on the lamp stem 4, have only straight sections which are configured for the represented respective tangential resting on the electrode rod 6. The polygons of FIG. 5, on the other hand, between the convex sections 18, have only concave sections 26 which are configured, correspondingly to the straight sections 20, for the represented respective resting on the outside on the electrode rod 6. The polygons 16 are regular polygons e.g. with convex sections 18 e.g. separated from one another approximately equally. Even though it is not shown in the figures, polygons having at least one straight section 20 and at least one concave section 26 may be used, for example in combination with nonround cross sections of the electrode rod 6 and/or of the lamp stem 4, or of the pinch 10.

The polygons 16 represented in FIG. 4 and FIG. 5 respectively have a periodicity corresponding in the installation position to precisely one circumference (i.e. 3600), that is to say a cross section has an equal whole number of respectively on the one hand convex sections 18 and on the other hand straight and/or concave sections 20, 26. This periodicity leads to a multiplicity of edges, extending along the electrode rod, of the envelope 14. This leads to an angle-anisotropic elasticity distribution, which may e.g. be provided in the case of a known existing main stress direction (impact movement direction 26).

The polygons 16 represented in FIG. 4 and FIG. 5 may be modified to the extent that they respectively have a periodicity in the installation position different than precisely one circumference, or not corresponding thereto. This modification may, for example, be carried out by an increase or reduction of the length of the straight sections 20 or of the concave sections 26, a uniform length change being provided. This periodicity different to a circumference leads over a plurality of adjacent revolutions to an approximately angle-isotropic elasticity distribution, which may be provided for example in the case of an alternating or not predeterminable impact movement direction 26. In other words: by the winding of the cross section of the wire spiral forming the envelope 14 along the longitudinal axis of the spiral envelope 14, or of the electrode rod 6, a damping effect covering 360° is obtained in the enclosed region. The periodicity not equal to one circumference may result in an edge profile wound in a screw fashion, namely a coil 27. For example, in the embodiment shown in FIG. 1 to FIG. 3, this results in a triangular polygon with in the present case a periodicity of about 345°, i.e. a periodicity smaller than 360° or than one revolution, in the present case an internal angle sum of the triangular polygon being about 195°, in a three-path and left-wound screw-like coil 27. In other words: the envelope 14 of the embodiment is a wire 15 wound in a screw-like fashion or in the manner of a coil spring, the complex sections 18 of which form in terms of profile a different screw-like coil 27 with three paths, or spirals. In the case of other periodicities not equal to one circumference, other distributions may also take place, for example (quasi) equal distribution or seemingly random distribution averaged over a plurality of adjacent revolutions.

In the embodiment represented in FIG. 1 to FIG. 3, the wire 15 is wound in the manner of a coil spring so that the pitch at least in the installation position corresponds to about two times the wire diameter, i.e. a distance between two adjacent wire turns corresponds approximately to the wire thickness. This is merely a possible embodiment, and a change in the elasticity may be adjusted by means of a change in the pitch. Furthermore, in the case of turns lying close to one another in the installation position, additional damping may be achieved by means of friction.

Figure 6:
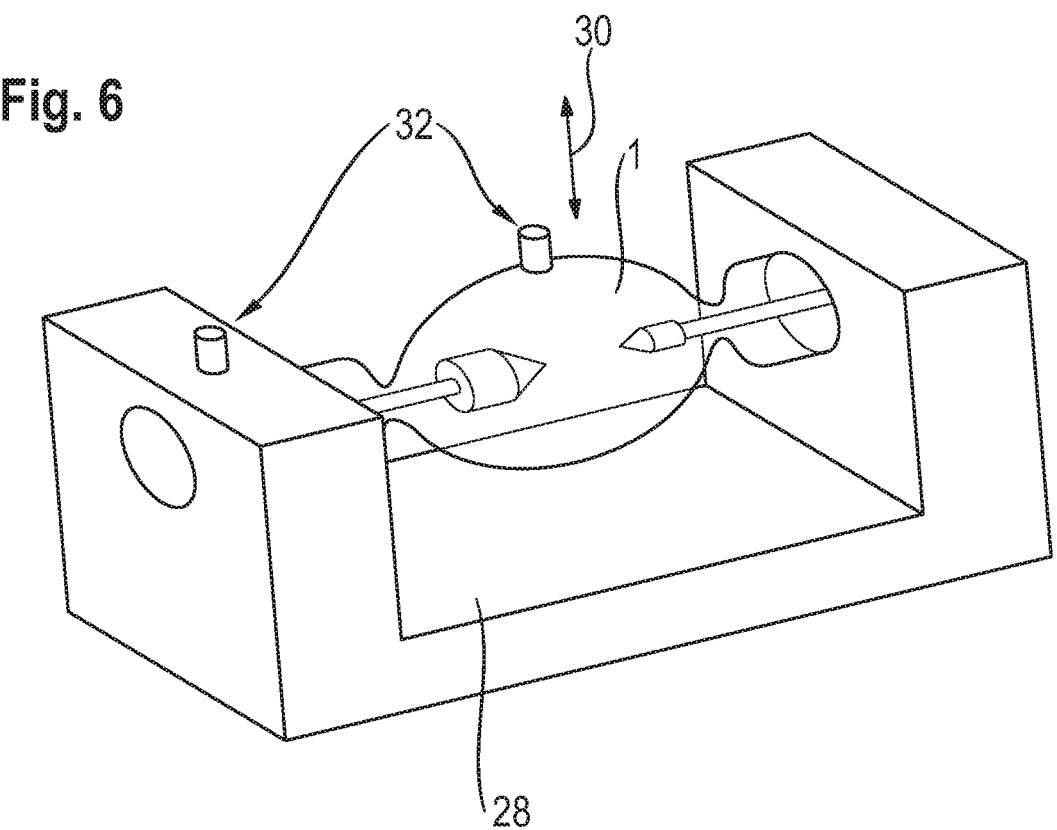
FIG. 6 shows in a perspective view, a test structure with a lamp for measuring an impact thereon.
Figure 7:
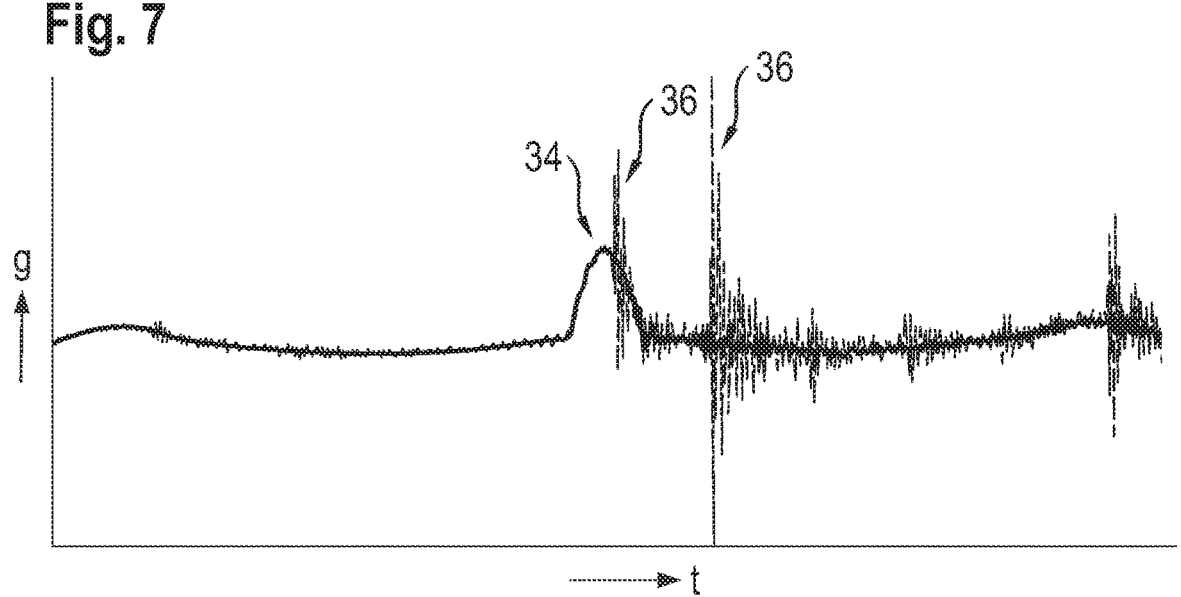
FIG. 7 shows a diagram of acceleration values plotted against time.
Figure 8:
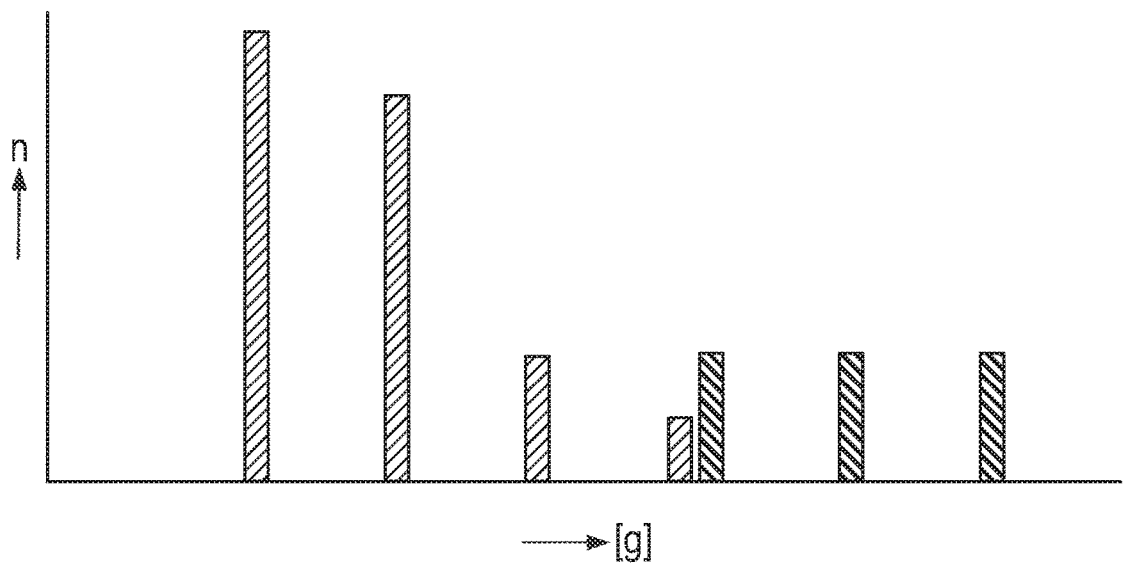
FIG. 8 shows a bar chart of failure events per maximum impact acceleration.

FIG. 6 to FIG. 8 show a series of tests for the embodiment of FIG. 1 to FIG. 3. A test structure shown in FIG. 6 includes a driveably displaceable or impactable holder 28, which makes it possible to apply an impact acceleration in a drive direction 30 represented by way of example onto the lamp 1 clamped in the holder 28. The measured load situation is thus a uniaxial impact. Acceleration sensors 32 on the holder 28 and on the lamp body 2 measure the impact reaction. FIG. 7 shows a profile of two measured acceleration values g against time t. The dotted line shows an acceleration profile without the bearing element 12 according to various embodiments, and the solid line shows an acceleration profile with the bearing element 12 according to various embodiments. It is in this case found that, after a peak value of a half-oscillation 34 corresponding to the impact, the dotted line has a plurality of high-frequency events 36 with maximum acceleration magnitudes, which due to the bearing element 12 according to various embodiments do not occur in the test plotted with the solid line. These events 36 correspond to an at least partially inelastic impact of the electrode rod 6 on the lamp stem 4.

The outcome of an exemplary series of tests with and without the bearing element 12 is represented in FIG. 8. The height of the rectangles shows the number n of lamps 1 which failed at the respective acceleration g (for example the maximum value in the respective half-oscillation 34), for example because of a crack in the respective lamp stem 4. In this case, the rectangles with a thin line correspond to the respective tests with a bearing element 12 having a circular cross section corresponding to the prior art, and the rectangles with a thick line correspond to the respective tests with the bearing element 12. FIG. 8 thus shows that the bearing element 12 reduces the impact sensitivity of the lamp 1, by impact of the electrode rod 6 on the lamp stem 4 being prevented or significantly reduced in magnitude, i.e. damped.

A modified embodiment contains a bearing element 12 in which the wire 15 is wound only once around the electrode rod 6 in order to form the envelope 14.

Instead of the wire 15, another embodiment has a foil which is flexurally stiff, and which surrounds the electrode rod 6 inside the lamp stem 4, or the pinch 10, and thus forms the envelope 14.

Disclosed is thus the arrangement of a bearing element 12, including an envelope 14, for instance made of the wire 15, with a polygonal cross section 16 of the envelope 14, around an electrode rod 6. This acts resiliently for transverse forces between the electrode rod 6 and a lamp stem 4 surrounding the bearing element 12.

Various embodiments provide a bearing element which is suitable to a high degree for resilient bearing of an electrode rod in a lamp stem. Suitability for series production may be provided.

By virtue of the fact that, according to various embodiments, the envelope has a polygonally shaped cross section, simultaneous resting of the same region of the envelope on both the electrode rod and the lamp stem is avoided, so that elastic or resilient bearing is made possible with a relatively large resilient travel in order to compensate for high-magnitude impacts. A particularly large resilient travel is achieved when the electrode rod and/or the lamp stem are in this case shaped nonpolygonally in cross section, for instance approximately roundly, approximately ovally, approximately rectangularly, or at least not mirror-invertedly. The envelope has the polygonally shaped cross section along the electrode rod at least in sections; if it has only polygonally shaped cross sections, this reduces the production costs of the bearing element by the use of only one manufacturing method; if, in addition to at least one section with a polygonally shaped cross section, it has at least one section with a nonpolygonally shaped cross section, such as a cross section which is round and/or shaped in the same way as the electrode rod, holding on the electrode rod 6 may be improved.

The polygonal cross section may be shaped approximately convexly in sections in order to rest on the lamp stem, so that for example there are at least two branches which yield resiliently in the event of an impact. The polygonal cross section may be shaped approximately straight and/or approximately concavely in order to rest on the electrode rod, so that a greater distance from the outer sections of the polygon allows a long resilient travel. If at least one, and e.g. every, section shaped convexly in order to rest on the lamp stem is formed so as to be rounded, flattened and/or mirror-inverted with respect to the lamp stem, stress peaks are avoided particularly reliably. Corresponding considerations also optionally apply for the straight/concave sections.

The envelope may for example be formed from a (flexurally stiff) foil, as a generic term for flatly shaped elements, in order to manufacture a monolayer or multilayer, such as an at least partially overlapping, flat envelope. The envelope may, for example, be formed from a wire in order to achieve an economical and readily processable, e.g. shapeable, material with an advantageous ratio of flexural stiffness to weight. The wire may have a wire cross section which is round, elliptical, rectangular, flattened or varying in sections. Examples of the foil include a strip or a plate-like flat piece.

Multidirectional resilience may be achieved when the polygonal cross section surrounds the electrode rod the manner of a coil, spiral or helically, or in the shape of a screw. In this case, the outer regions of the polygon preferably respectively form a path. This path, or this coil, may extend approximately along the electrode rod or at least partially around the electrode rod. In various embodiments, the coil is formed by a periodicity of the polygonal cross section which is different, e.g. smaller, than at least one revolution about a rod longitudinal axis. A periodicity different than at least one revolution about the rod longitudinal axis may mean that a revolution of the envelope does not correspond to a whole number of convex sections of the envelope and to the same number of concave and/or straight sections of the envelope. A periodicity different than at least one revolution about a rod longitudinal axis may, with a triangular cross section of the coil, mean a triangle with an internal angle sum less than or greater than 180°, correspondingly resulting in a larger or smaller periodicity.

Because of the processability on the one hand, and the thermal stability for use in a discharge lamp on the other hand, the envelope may contain or essentially consist of a metallic material, wherein high-temperature-resistant materials, such as tungsten and/or molybdenum and/or an alloy including such, may be provided.

A bearing arrangement may include a multiplicity of bearing elements as described above, for example arranged axially in a row. This may simplify mounting and/or, in the case of electrode rods of different lengths, simplify position holding.

A lamp according to various embodiments contains at least one bearing element as described above, interposed between an electrode rod and a lamp stem, for instance connected radially and resiliently between them. In the lamp according to various embodiments, e.g. at least one axial section resting on the lamp stem is formed with a polygonal cross section. An electrode rod may form and/or support an electrode or an anode of the lamp. Usually, the electrode rod and the lamp stem may be connected firmly at a position axially different than the bearing element, for instance rigidly connected, multivalently connected (in the sense of a bearing receiving at least from 4 to 6 degrees of freedom), and/or connected in a gas-tight fashion. The lamp may be a discharge lamp, in particular a xenon discharge lamp.

A method according to various embodiments for producing a lamp includes the enclosure of an electrode rod with at least one bearing element as described above. The electrode rod is then in the polygon, and its inertial forces may be absorbed (for instance damped) resiliently in the event of an impact. In the case of a lamp stem firmly connected to the electrode rod, the at least one bearing element is arranged in the lamp stem. The enclosure may, for example, involve insertion of the electrode rod into the preshaped bearing element or formation of the bearing element around the electrode rod (for example from a semifinished product). Interposed between the lamp stem and the envelope, there may be a tube section, e.g. made of glass, in order to improve producibility. The lamp stem may then be connected to a lamp body, e.g. to a discharge vessel, for example by glass fusion, in order to provide a transition which is as homogeneous as possible. Provision may be made then to reduce a cross section or diameter of the lamp stem for (until) resting on the bearing element, for example by the lamp stem being softened and pressed by a shaping roller, for example while forming an e.g. circumferential pinch, in order to improve support of the electrode rod in the lamp stem.

Lastly, various embodiments include the use of a bearing element as described above for resiliently supporting a for example metallic electrode rod in a, for example, glass lamp stem, so that a high resilient travel can be achieved for absorbing large-magnitude impacts.

The term "approximately" may for example mean that there may be a deviation within tolerances customary in the art, or of up to 5%.

Described by way example in other words: an envelope surrounding the electrode rod, e.g. a wire coil surrounding the electrode rod, may be arranged in the region of the bearing section. This envelope may have a polygonal cross section, such as a triangular cross section, which is wound around the electrode rod, along the electrode rod. By deformation of the envelope, an impact is elastically damped, for example by elastic spreading of the sides of the triangle. By the winding, resilience/damping is achieved over 360° around the electrode rod. This envelope may act as a buffer between the electrode rod and the lamp stem. A further effect is that the envelope increases the diameter of the bearing (corresponding to a thicker electrode rod), so that a larger diameter is imparted to the lamp stem in the region of the bearing, so that the rigidity increases. By the bearing element according to various embodiments, overall a lamp is obtained which is more insensitive to impacts. Besides improved durability, this has secondary effects, such as reduced packaging and transport costs.

LIST OF REFERENCE SIGNS

| | |
|---|---|
| lamp | 1 |
| lamp body | 2 |
| lamp stem | 4 |
| electrode rod | 6 |
| anode body | 8 |
| pinch | 10 |
| bearing element | 12 |
| envelope | 14 |
| wire | 15 |
| polygon | 16 |
| convex section | 18 |
| straight section | 20 |
| yielding movement | 22 |
| impact movement direction | 24 |
| concave section | 26 |
| coil | 27 |
| holder | 28 |
| drive direction | 30 |
| acceleration sensor | 32 |
| half-oscillation | 34 |
| event | 36 |
| acceleration | g |
| number | n |
| time | t |

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A bearing element for an electrode rod in a lamp stem, the bearing element comprising:
   an envelope configured in order to extend along a longitudinal axis of the electrode rod;
   wherein the envelope comprises or consists of a wire;
   wherein the envelope has a polygonally shaped cross section at least in sections; and
   wherein the polygonal cross section forms a coil at least when resting on the electrode rod.

2. The bearing element of claim 1,
   wherein the polygonal cross section comprises at least one approximately convex section configured in order to rest on the lamp stem, and at least one approximately straight section configured in order to rest on the electrode rod.

3. The bearing element of claim 1,
   wherein the polygonal cross section comprises at least one approximately convex section configured in order to rest on the lamp stem, and at least one approximately concave section configured in order to rest on the electrode rod.

4. The bearing element of claim 1,
   wherein the coil is formed by a periodicity of the polygonal cross section which is different from at least one revolution about a rod longitudinal axis.

5. The bearing element of claim 4,
   wherein the coil is formed by a periodicity of the polygonal cross section which is smaller than at least one revolution about a rod longitudinal axis.

6. The bearing element of claim 1,
   wherein the envelope contains or consists of at least one of tungsten or molybdenum.

7. The bearing element of claim 1, wherein the envelope consists of a wire;
   and wherein the wire has the polygonally shaped cross section.

8. A bearing element arrangement, comprising:
   a multiplicity of bearing elements, each bearing element comprising:
   an envelope configured in order to extend along a longitudinal axis of the electrode rod;
   wherein the envelope comprises or consists of a wire;
   wherein the envelope has a polygonally shaped cross section at least in sections; and
   wherein the polygonal cross section forms a coil at least when resting on the electrode rod.

9. A lamp, comprising:
   a bearing element, comprising:
   an envelope configured in order to extend along a longitudinal axis of the electrode rod;
   wherein the envelope comprises or consists of a wire;
   wherein the envelope has a polygonally shaped cross section at least in sections; and
   wherein the polygonal cross section forms a coil at least when resting on the electrode rod;
   wherein the bearing element extends along an electrode rod in a lamp stem and which is arranged between the electrode rod and the lamp stem.

10. A lamp, comprising:
    a bearing element arrangement, comprising a multiplicity of bearing elements, each bearing element comprising:
    an envelope configured in order to extend along a longitudinal axis of the electrode rod;
    wherein the envelope comprises or consists of a wire;
    wherein the envelope has a polygonally shaped cross section at least in sections; and
    wherein the polygonal cross section forms a coil at least when resting on the electrode rod;
    wherein the bearing element arrangement extends along an electrode rod in a lamp stem and which is arranged between the electrode rod and the lamp stem.

11. A method for producing a lamp, the method comprising:
- providing an electrode rod;
- enclosing the electrode rod with a bearing element, the bearing element comprising:
  - an envelope configured in order to extend along a longitudinal axis of the electrode rod;
  - wherein the envelope comprises or consists of a wire;
  - wherein the envelope has a polygonal cross section; and
  - wherein the polygonal cross section forms a coil at least when resting on the electrode rod.

12. The method of claim 11, further comprising:
- preceding or subsequent to or simultaneous with the enclosure: inserting the envelope with a polygonal cross section into a preferably glass tube section.

13. The method of claim 11, further comprising:
- subsequently connecting the lamp stem to a lamp body.

14. The method of claim 11, further comprising:
- subsequently reducing the cross section of a lamp stem connected to the electrode rod in order to rest on the bearing element.

15. A method for producing a lamp, the method comprising:
- providing an electrode rod;
- enclosing the electrode rod with a bearing element arrangement, the bearing element arrangement comprising a multiplicity of bearing elements, each bearing element comprising:
  - an envelope configured in order to extend along a longitudinal axis of the electrode rod;
  - wherein the envelope comprises or consists of a wire;
  - wherein the envelope has a polygonal cross section; and
  - wherein the polygonal cross section forms a coil at least when resting on the electrode rod.

16. The method of claim 15, further comprising:
- preceding or subsequent to or simultaneous with the enclosure: inserting the envelope with a polygonal cross section into a preferably glass tube section.

17. The method of claim 15, further comprising:
- subsequently connecting the lamp stem to a lamp body.

18. The method of claim 15, further comprising:
- subsequently reducing the cross section of a lamp stem connected to the electrode rod in order to rest on the bearing element arrangement.

* * * * *